(12) United States Patent
Lal

(10) Patent No.: US 7,373,221 B2
(45) Date of Patent: May 13, 2008

(54) ENERGY CONSUMPTION MONITORING

(76) Inventor: Depak Kaura Lal, 3, Home Ground Cricklade, Wiltshire SN6 6JG (GB)

( * ) Notice: Subject to any disclaimer, the term of this patent is extended or adjusted under 35 U.S.C. 154(b) by 0 days.

(21) Appl. No.: 10/523,988

(22) PCT Filed: Jul. 31, 2003

(86) PCT No.: PCT/GB03/03338

§ 371 (c)(1),
(2), (4) Date: Mar. 3, 2006

(87) PCT Pub. No.: WO2004/015837

PCT Pub. Date: Feb. 19, 2004

(65) Prior Publication Data

US 2006/0161310 A1 Jul. 20, 2006

(30) Foreign Application Priority Data

Aug. 8, 2002 (GB) .................................. 0218452.1

(51) Int. Cl.
*G06F 19/00* (2006.01)
(52) U.S. Cl. ................. 700/291; 700/295; 702/61; 236/47
(58) Field of Classification Search ................. 700/28, 700/31, 83, 286, 291, 295; 702/61; 703/2, 703/7; 705/412; 165/238; 236/47
See application file for complete search history.

(56) References Cited

U.S. PATENT DOCUMENTS 6,178,362 B1 1/2001 Woolard et al.
6,216,956 B1 * 4/2001 Ehlers et al. ................. 236/47

(Continued)

*Primary Examiner*—Leo Picard
*Assistant Examiner*—Douglas S Lee
(74) *Attorney, Agent, or Firm*—Blakely, Sokoloff, Taylor & Zafman; Stephen M. De Klerk

(57) ABSTRACT

A system for analysing energy usage on a network, such as an electricity network (4) which includes a number of energy sources (1, 2, 3) and a number of energy consumers (6, 7, 8, 10, 11, 12) the system including a plurality of meters (5,9) on the network which monitor energy usage on the network at intervals throughout a day, the meters supplying data to data processing apparatus (16, 17) which aggregates the data so as to provide an indication of current total energy usage, and which stores data so as to permit the retrieval of historical energy usage for predetermined intervals on days of the year, wherein the data processing apparatus further compares current total energy usage for a particular point or period of time in the year with average historical total energy usage for that point or period of time, and generates an index which indicates the difference between the average historical energy usage and the current total energy usage. A period of time is taken for data to be received from all of the meters (5, 9), and once the data has been received from all of the meters and aggregated, subsequent aggregate totals are calculated at intervals substantially shorter than said period of time using the latest data received from all of the meters. The index can be used to reduce the financial effects of imbalances in a network in which retailers contract for the supply of energy from energy producers. In such an arrangement, the retailer's own demand error is calculated using the commonly applicable index by producers and retailers, to give an indication of the degree of imbalance in the market. Financial derivatives can be used to hedge the financial consequences of imbalances.

20 Claims, 2 Drawing Sheets

Integrated 30 minute reading

U.S. PATENT DOCUMENTS

| | | | |
|---|---|---|---|
| 6,577,962 B1 * | 6/2003 | Afshari | 702/61 |
| 6,636,893 B1 * | 10/2003 | Fong | 709/223 |
| 6,778,882 B2 * | 8/2004 | Spool et al. | 700/295 |
| 6,785,592 B1 * | 8/2004 | Smith et al. | 700/291 |
| 6,937,946 B1 * | 8/2005 | Culp et al. | 702/62 |
| 6,996,508 B1 * | 2/2006 | Culp et al. | 703/2 |
| 7,085,660 B2 * | 8/2006 | Mansingh et al. | 702/60 |

* cited by examiner

Integrated 30 minute reading

10% of historic demand HD (35)

90% of historic demand HD (36)

Integrated 30 minute reading

ENERGY CONSUMPTION MONITORING

This is a National Phase of International Application No. PCT/GB2003/003338, filed on Jul. 31, 2003, which claims priority from Great Britain Patent Application No. 0218452.1, filed on Aug. 8,2002.

This invention relates to the monitoring of energy consumption, such as gas or electricity consumption on a network such as the national electricity grid in England.

In many countries such as England, electricity market trading arrangements are based on a commodity market model in which there are producers, i.e. electricity generating companies and retailers, who trade in electricity between the producers and end consumers. The traders, i.e. producers and retailers, are required to know what their physical requirements are for electricity ahead of actual production and consumption. The traders are then expected to take contractual positions to cover their requirements. Any difference between the contractual positions for physical energy and the actual energy produced or consumed is penalised through a central market mechanism. The objective is to get the traders to take responsibility to balance their own physical and contractual positions.

In the electricity market there is a constant drive to physically balance supply and demand on an instant-by-instant basis. The activity is a 24-hour a day and seven day a week process because, for all practical purposes, it is deemed that volume electricity cannot be stored at an economic cost. It must be produced at the time it is to be consumed. Consequently, the production of electricity is balanced with actual demand on a real-time basis. The current technical solution to ensuring that there is no shortfall in the amount of generation to meet demand is for the network operator to hold a considerable amount of contingent generation plant capacity on the network, on behalf of all the stakeholders on the network, in large measure determined by such factors as the uncertainty in the demand forecast and the largest single technical failure event on the network. The amount held is based on a relatively static crude estimate of contingent margin to be called on by the network operator at his discretion.

To define a consistent period over which the traders in the market can settle their accounts, in the English electricity market there is a Settlement Period, having a duration of 30-minutes. There are 48 such Settlement Periods in a standard day. For each trader in the market, the contractual position for each Settlement Period must be consistent with the actual physical position if penalties are to be avoided. By contrast, the Settlement Period for the UK gas market is currently 24 hours.

The cost of balancing the network is based on the bids and offers accepted by the network operator of the electricity grid from the traders active in the balancing market to either provide more energy or take more energy from the network. The cost incurred of balancing the network forms the basis of penalties to those parties out of balance, i.e. where the physical position varies from the notified contractual position. In the ideal circumstance, physical balancing and security would be actively managed by the traders so that central market penalties would not apply.

Typically, the producers of energy are in a position of strength in the electricity (and gas) markets. They deliver the volume of contracted energy at the appropriate time. There are occasional problems associated with engineering failures of plant and also there is the unreliability of output of, for example, wind-powered generators that compromise the ability of producers to meet contractual positions. However, in general the producer community deliver on their contracts because the output is controllable. They also serve the network by holding excess plant on the network.

The main problem is on the consumption side of the market. Consumers, in most cases, demand electricity and gas at a time of their choosing. Consumer demand fluctuates quite widely for the individual consumer. A single household will consume energy in a way that is largely unpredictable. On a population basis, the demand is more predictable but there is still substantial/material room for error. The major factors affecting demand are environmental factors such as weather and daylight, and also television viewing patterns—which can be unpredictable. It is extremely difficult for retailers to accurately predict in advance what the actual demand of consumers will be for a particular Settlement Period. This leaves retailers buying either too little or too much energy in the market and then suffering the consequential penalties. In general retailers tend to go long in the market to ensure that they have sufficient energy to cover their customer demands as this is the only sensible risk management strategy available to them at this time.

In trading terms, the problem that retailers cannot resolve is that the physical energy consumed can practically only be known once it has been consumed. Yet purchase contracts for capacity (by the network operator or by traders) and production to schedule plant need to be agreed in advance of consumption. It follows that retailers would benefit from access to more physically efficient and technologically effective tools that allow them to manage the risk and consequences of being out of balance.

Whilst analysis of past consumption patterns, weather forecasts, television schedules and so forth can enable electricity retailers to predict consumption to a certain extent, there is a need to monitor real time consumption. If there is a rise or drop in consumption compared to predicted patterns, this may indicate that the following predictions may need to be altered. For example, there may be an unexpected news event which will result in people stopping their normal activities to watch the television.

In the English electricity market, there is the concept of "Gate Closure". The market for trading physical energy is closed a predetermined period ahead of energy consumption, for example 1.5 hours. The present system of monitoring network consumption for balancing is based on a summation of network meter readings on a two minute cycle, using perhaps 1200 meters on the electricity network in England. In practise the network operator also takes account of other information that is available to the network operator such as the changes in frequency and voltage as more sensitive indicators of network imbalance.

One object of the present invention is to provide a common reference framework enabling a more accurate prediction of energy consumption.

Viewed from one aspect, the present invention provides a system for analysing energy usage on a network which includes a number of energy sources and a number of energy consumers, the system including a plurality of meters on the network which monitor energy usage on the network, the meters supplying data to data processing apparatus which aggregates the data so as to provide an indication of current total energy usage, and which stores data so as to permit the retrieval of historical energy usage for points or periods of time in a year, wherein the data processing apparatus further compares current total energy usage for a particular point or period of time in a year with a standard total energy usage based on historical energy usage for that point or period of time in a year, and generates an index which indicates the difference between standard energy usage and the current total energy usage.

The comparison may be carried out for a particular moment of time on a particular day in the year, or for a period of time in a year which could for example be a day in the year, or longer, or for example be a particular fifteen or thirty minute period in a particular day in the year, or shorter. The standard energy usage could be the actual historical energy usage for a year, such as the preceding year, or an average of the historical energy usage over a number of years. In some instances there may not be suitable historical data for the actual point or period of time, and in such circumstances the historical data may be extrapolated to give the standard total energy usage for that classification of point or period of time. Either at the time of making the comparison, or by providing modified historical data, there could be taken into account any known trends from year to year. For example, if there is a known year on year increase in demand, then that can be factored in so that the standard usage is appropriate for the current year.

In one particular embodiment, the historical usage data provides total energy usage for each of a number of predetermined intervals, which could for example be separate days of the year, or thirty minute periods throughout the year, taken as average values over a number of years. Current total energy usage is calculated at intervals of time substantially shorter than the predetermined intervals, and the values integrated to provide a value of total energy usage over a rolling period of time which is the same length as the predetermined interval. This is compared with data extrapolated from the historical data. For example, at the time of a particular comparison, there may be calculated the proportions of the rolling period of time which lie in two adjacent predetermined intervals of time, and the historical values for those two predetermined intervals are combined in those proportions to provide the standard usage figure for comparison purposes.

Viewed from another aspect, the invention provides a method of analysing energy usage on a network which includes a number of energy sources and a number of energy consumers, the system including a plurality of meters on the network which monitor energy usage on the network, wherein the meters supply data to data processing apparatus which aggregates the data so as to provide an indication of current total energy usage, and which stores data so as to permit the retrieval of historical energy usage for points or periods of time in a year, the data processing apparatus further comparing current total energy usage for a particular point or period of time in a year with a standard total energy usage based on historical energy usage for that point or period of time in a year, and generating an index which indicates the difference between standard energy usage and the current total energy usage.

Viewed from another aspect, the invention provides data processing apparatus for use in a system for analysing energy usage on a network which includes a number of energy sources and a number of energy consumers, the system including a plurality of meters on the network which monitor energy usage on the network, wherein the data processing apparatus is adapted to receive data from the meters, to aggregate the data so as to provide an indication of current total energy usage, and to store the data so as to permit the retrieval of historical energy usage for points or periods of time in a year, and wherein the data processing apparatus is further adapted to compare current total energy usage for a particular point or period of time in a year with a standard total energy usage based on historical energy usage for that point or period of time in a year, and to generate an index which indicates the difference between standard energy usage and the current total energy usage.

Viewed from another aspect, the invention provides a computer software product containing instructions to be loaded on to data processing apparatus so as to configure the data processing apparatus so as to be adapted for use in a system for analysing energy usage on a network which includes a number of energy sources and a number of energy consumers, the system including a plurality of meters on the network which monitor energy usage on the network, wherein the computer software product is such that data processing apparatus will be configured to be adapted to receive data from the meters, to aggregate the data so as to provide an indication of current total energy usage, and to store the data so as to permit the retrieval of historical energy usage for points or periods of time in the year, and wherein the computer software product is such that the data processing apparatus will be further configured to be adapted to compare current total energy usage for a particular point or period of time in a year with a standard total energy usage based on historical energy usage for that point or period of time in a year, and to generate an index which indicates the difference between standard energy usage and the current total energy usage.

The computer software product may be in the form of data recorded on a physical carrier such as a diskette, CD or tape, or may be in the form of signals transmitted over a suitable communications medium such as the Internet or another network.

Retailers of energy and others involved with the network can use a combination of the index and the actual current energy usage to determine their exposure to imbalances and to take steps to manage that commercial exposure. Thus, in preferred embodiments of the invention there can be provided a common reference framework for producers and retailers, reconciling the differing perspectives, to enable the parties for example to trade hedging contracts across the market that enable risk management with a common basis for valuations based on the magnitude of the potential imbalance. The index provides this reference framework.

As noted above, the conventional system of monitoring total energy consumption on the electricity network in England is based on a summation of spot network meter readings on a two minute cycle. On average, data will be one minute old by the time it is used. In a preferred embodiment of the invention there is provided an improved system for monitoring consumption, that will provide data that is more relevant. In accordance with such an embodiment, the aggregate is not calculated at the end of each cycle in which all meter readings have been received. Instead, the aggregate is calculated continuously.

There are a number of ways in which this can be achieved. For example, as a new meter reading is read, a new aggregate can be calculated, the receipt of the new reading triggering the calculation process. Alternatively, the aggregate can be recalculated at predetermined intervals which are significantly shorter than the duration of a cycle in which all updated meter readings have been received. For example, if the aggregate is calculated every 10 seconds in a system in which there are 1200 meters and in which a cycle takes two minutes, perhaps about 100 meter readings will be updated at each aggregate calculation. Preferably, the readings are polled at intervals in the range of 1 to 30 seconds apart, more preferably 1 to 10 seconds or 1 to 5 seconds. Readings preferably take place throughout a day.

In any event, aggregates are calculated which include some readings which have been updated since the previous aggregate calculation and some which have not The effect is that an aggregate calculation is made using readings from all meters to calculate a total T(t) at time (t), and that when one or more meter readings have been updated, but before all meter readings have been updated, there is calculated at time (t+1) a new total T(t+1) which is the previous total T(t), less the previously stored individual meter reading(s) for the meter(s) from which an updated reading has been received, plus the updated reading(s) received.

The data manipulated and produced could be actual consumption figures, raw data from meters, or anything else which is representative of consumption.

Whilst of particular use in the implementation of the system and method which enables the retailers of energy to reduce the economic effect of imbalances if they detect, from updated data, that there are likely to be such imbalances, the figures received may be used for any analytical purposes.

Thus viewed from one aspect a further invention provides a system for analysing energy usage on a network which includes a number of energy sources and a number of energy consumers, the system including a plurality of meters on the network which monitor energy usage on the network, wherein the meters supply data to data processing apparatus which aggregates the data so as to provide an indication of current total energy usage, wherein a period of time is taken for data to be received from all of the meters, and once the data has been received from all of the meters and aggregated, subsequent aggregate totals are calculated at intervals substantially shorter than said period of time using the latest data received from all of the meters.

Viewed from another aspect, the further invention provides a method of analysing energy usage on a network which includes a number of energy sources and a number of energy consumers, the system including a plurality of meters on the network which monitor energy usage on the network, wherein the meters supply data to data processing apparatus which aggregates the data so as to provide an indication of current total energy usage, wherein a period of time is taken for data to be received from all of the meters, and once the data has been received from all of the meters and aggregated, subsequent aggregate totals are calculated at intervals substantially shorter than said period of time using the latest data received from all of the meters.

Viewed from another aspect, the further invention provides data processing apparatus for use in a system for analysing energy usage on a network which includes a number of energy sources and a number of energy consumers, the system including a plurality of meters on the network which monitor energy usage on the network, wherein the data processing apparatus is adapted to receive data from the meters and to aggregate the data so as to provide an indication of current total energy usage, and wherein a period of time is taken for data to be received from all of the meters, and the data processing apparatus is adapted so that once the data has been received from all of the meters and aggregated, subsequent aggregate totals are calculated at intervals substantially shorter than said period of time using the latest data received from all of the meters.

Viewed from another aspect the invention provides a computer software product containing instructions to be loaded on to data processing apparatus so as to configure the data processing apparatus so as to be adapted for use in a system for analysing energy usage on a network which includes a number of energy sources and a number of energy consumers, the system including a plurality of meters on the network which monitor energy usage on the network, wherein the computer software product is such that data processing apparatus is configured so as to be adapted to receive data from the meters and to aggregate the data so as to provide an indication of current total energy usage, and wherein a period of time is taken for data to be received from all of the meters, and computer software product is such that the data processing apparatus is configured to be adapted so that once the data has been received from all of the meters and aggregated, subsequent aggregate totals are calculated at intervals substantially shorter than said period of time using the latest data received from all of the meters.

The computer software product may be in the form of data recorded on a physical carrier such as a diskette, CD or tape, or may be in the form of signals transmitted over a suitable communications medium such as the Internet or another network.

In a preferred embodiment, used in connection with producing an index as described above, there is created the most up to date record of actual system demand. Each new meter reading is used as soon as it arrives, or in batches at short intervals, by substituting the old meter reading(s) by the new meter reading and immediately aggregating. This creates a rolling indication of spot energy flows that includes the most up-to-date readings. The time accuracy of this substitution concept is only limited by the technical limits of how quickly meter readings can be collected and how frequently it is wished to perform calculations, i.e. instantly or at short intervals.

When one or more new meter reading arrives, all the spot readings of network demand over the past 30-minutes, or another suitable period, are integrated. Hence a rolling 30-minute indication of network demand is provided. Integration can be done through electronics via analogue signals or using software. The summation can be done by taking an analogue signal from various meters and then using hardware electronics to aggregate the signals to create a value for network demand. This could provide a real-time accurate indication of spot network demand. However it is an expensive technical solution. Data aggregation of meter readings through software is cheaper without significant loss of accuracy in relation to the problems being addressed. Indeed, there are several elements of data manipulation that could be effected via electronics but software solutions are more versatile and cheaper.

Another way of expressing this aspect of the invention is to say that once the data has been received from all of the meters and aggregated, subsequent aggregate totals are calculated using a concept of immediate substitution instead of periodic aggregation.

In the preferred system for predicting usage, a retailer should take account of whatever information on demand is available to forward predict the retailer's own customer demand and to then buy financial options to manage the financial consequences of errors in the prediction. The index provided by using the present invention has advantages over other methods which might be possible, when it comes to physical balancing and hedging activities. The method described above, using real-time actual demand, is more accurate and more useful.

Since the probability of getting the physical forecast absolutely right is significantly less than 100%, the energy retailer can more constructively manage his cost of being out of balance through financial hedging, both pre and post Gate Closure. The probabilistic nature of forecasting accuracy highlights why physical balancing by retailers is of limited value and why it is can usefully be supplemented by financial hedging if the retailer is to manage business exposure. The importance of physical forecasting is greatly reduced if financial hedging tools can be used to manage the consequences of errors. The use of financial hedging instruments allows traders to continue to trade post Gate Closure and right up to energy consumption. The physical position remains unchanged but the financial consequences of uncertainties can still be actively managed. This will feed into the amount of plant held on the system to secure the network.

The producers and retailers of energy can trade options to hedge the financial exposure. The parties can trade call and put options on the price of imbalances. In the English market the price of imbalances is denoted System Buy Price (SBP) and System Sell Price (SSP). If S is the strike price, a call option for SBP might payout £(S-SBP) for a standardise contract volume of (say) 1 MWh. A producer and retailer may trade many of these contracts to get the appropriate volumetric level (MWh) of contracts to cover the physical volume of energy at risk. Similar contracts can be constructed for puts and SSP hedges.

However a potentially better embodiment of the solution might be to trade options that payout a fixed amount (say £20/MWh) for the volume of MWh under contract for any value of D* when D* is above a Strike value. This embodiment greatly simplifies the traded market because the only externally generated variable is D* rather than D*, SBP and SSP. It also significantly reduces the granularity in the market by reducing the number of products traded from SBP and SSP options to just D* options.

The volumes of options contracts offered by producers (in relation to generator units in the case of electricity) that are expected to be active in the balancing process for a particular Settlement Period will define to some degree the producer's desired market share in the balancing market if the producer wants a hedged position.

Further sales of such options contracts in relation to very high priced marginal generating units that are not expected to play a part in balancing, provide a means of rewarding generating units that provide a service with regard to network security.

The result is that both sides of the market have the potential for price and volume certainty and risk management, and trading across the market will provide a mechanism for price discovery. In addition network security is enhanced.

Once a spot market in options is developed, there is another market in consequential derivatives that would follow. For example, for a particular Settlement Period, there could be an option traded to cover the price exposure for the working days (or non-working days) in a particular month, for example. This kind of product would be particularly useful for those smaller traders who do not want to be actively managing their positions on a real time basis and want a simple product that works over a long period of time.

Traders can constructively buy and sell physical energy up to Gate Closure and register the energy in their contractual accounts. Post Gate Closure, the only option is to deal with the financial consequences of imbalances. At Gate Closure, a more refined index might also be introduced, which is the difference between the index calculated as explained above and the index at Gate Closure.

With options, the financial outlay is the option premium. With physical energy, the purchase outlay is much higher and the trader still does not know whether the action will put the trader back into balance in either direction, and it could be out of balance in the opposite direction if the trader goes too far. Given the inherent uncertainty in forecasting, retailers will probably do some simple pre Gate Closure physical balancing, with some financial hedging, several hours ahead of physical consumption and then increasingly use financial hedging as the time of energy consumption approaches. This takes the stress out of forecasting accuracy.

Financial options also have another useful attribute. Traders can take a portfolio position on prices and volumes covered so that they can spread their position. With a range of strike prices and a range of volumes, traders can fine-tune their risk position to take account of their appetite for risk. Delta hedging and rebalancing strategies will be the normal practise for the traders.

Much of the detail described above can be refined so that the model is not just based on correlating demand and demand variances to ND. The market could also provide data on a regional basis since the metering on the (transmission and distribution) network exists to do this.

By use of the systems and methods described above, it is possible to provide a solution to the markets problems that has three elements: the forecasting of the retailers own demand error; the use of a commonly applicable index by producers and retailers that gives a measure of imbalance in the market; and the use of financial derivatives that hedge the financial consequences of imbalances.

Viewed from one aspect, another invention disclosed provides a method of reducing the financial effects of imbalances in a network in which retailers contract for the supply of energy from energy producers, the method comprising the steps of forecasting the retailer's own demand error, using a commonly applicable index by producers and retailers to give an indication of the degree of imbalance in the market; and using financial derivatives to hedge the financial consequences of imbalances.

In carrying out the inventions described above, data processing apparatus may comprises a number of separate physical units such as one or more servers and/or one or more clients, which may be at the same or different locations and linked by a suitable means. References to a network for energy supply, include all, parts or a single part of the network.

Some embodiments of the invention will now be described by way of example and with reference to the accompanying drawings, in which.

Figure 1:
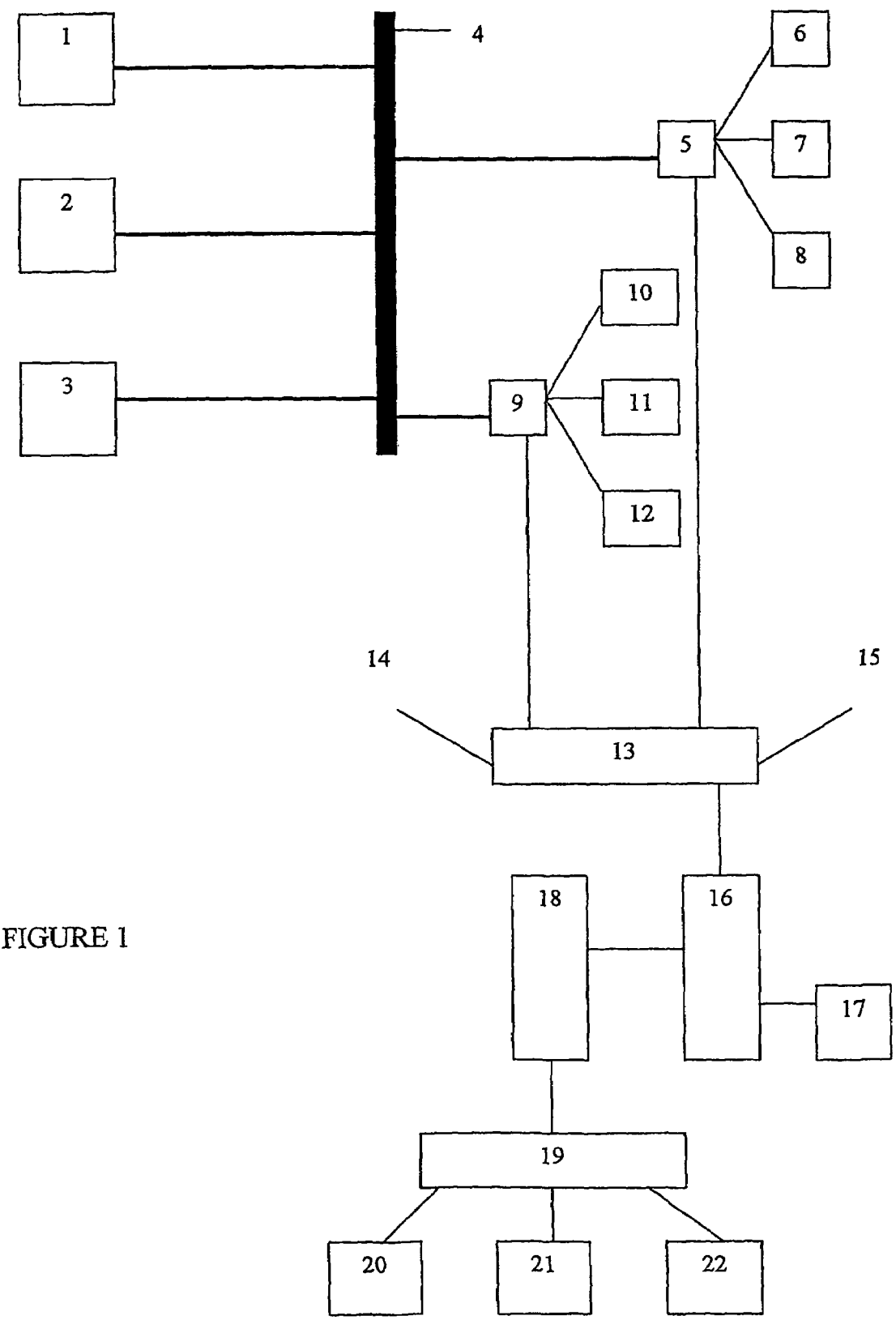
FIG. 1 is a diagram of a system in accordance with the invention.

As shown in FIG. 1, electricity generating plants 1, 2 and 3 are linked to an electricity network 4 for the transportation of electricity. One segment of the network supplies, through a meter 5, consumers 6, 7 and 8. Another segment of the network supplies, through meter 9, consumers 10, 11 and 12. The meters 5 and 9 provide data as to usage, to a computer data network 13. Other meters are also connected to the data network 13, as indicated by way of example at 14 and 15.

Also linked to the data network 13 is a data collection and analysis data processing server 16, which is provided with non-volatile random access data storage 17, such as an array of hard disk drives. Data calculated by the server 16 is provided to a publicly accessible data processing server 18, which is linked via a data network 19 to client data processing terminals 20, 21 and 22 where the data can be viewed and analysed.

On both the entry and exit points on a national electricity supply grid, real-time energy meters measure energy flows. The network operator uses the real-time data from the meters (and from meters on the entry points to the electricity network 4), supplied to the server 16, to manage power flows on a real time basis. The data is not as accurate as settlement metering. However, for the purposes of the present invention it is the relative changes in energy flows that are of interest.

The server 16 reads the real-time meters approximately every two minutes. The reading are summed and the result forms an estimate of the spot network demand (NDspot) in Megawatts. In the system in accordance with one aspect of the invention, as a meter reading is collected from meter 9, for example, the previous reading of meter 9 should be immediately substituted in NDspot by the new reading for meter 9. If this is done for all meters on a continuous basis as and when the meter reading arrives, the value of NDspot will be based on the most up-to-date information available. This will greatly enhance the accuracy of the measured relative energy flows on the network.

The following is one proposed way in which NDspot will be calculated.

$NDspot_t$ is the network demand at time, t $NDspot_{t+\Delta t}$ is the network demand at a later time, $t+\Delta t$ $mx_i$ is the ith meter reading for meter x. It can have a positive or negative value.

Assume a Base Point at (say) 03:00 hours each day.

$$NDspot_0 = \Sigma(m1_0 + m2_0 + m3_0 + m4_0 + m5_0 + m6_0 + m7)$$

As time moves forward, the total metered volume becomes $NDSpot_t$ where t designates a point in time.

As each subsequent meter reading arrives, the old meter reading is substituted by the new meter reading to give a revised value of NDspot.

$$NDspot_{t+\Delta t} = NDspot_t - mx_{i-1} + mx_i$$

This algorithm works whether the meter readings arrive sequentially or in some random sequence. In each case all available data is used as soon as it becomes available.

Because of rounding (and other) errors that will invariably creep into the substitution and aggregation process, it is recommended that a quiet point in the 24-hour day be used to re-establish a base point of readings (so that errors are not compounded into perpetuity). The most appropriate time for this base point might be sometime between 01.00 to 05.00 when demand tends to be flat and the market extremely quiet.

Figure 2:
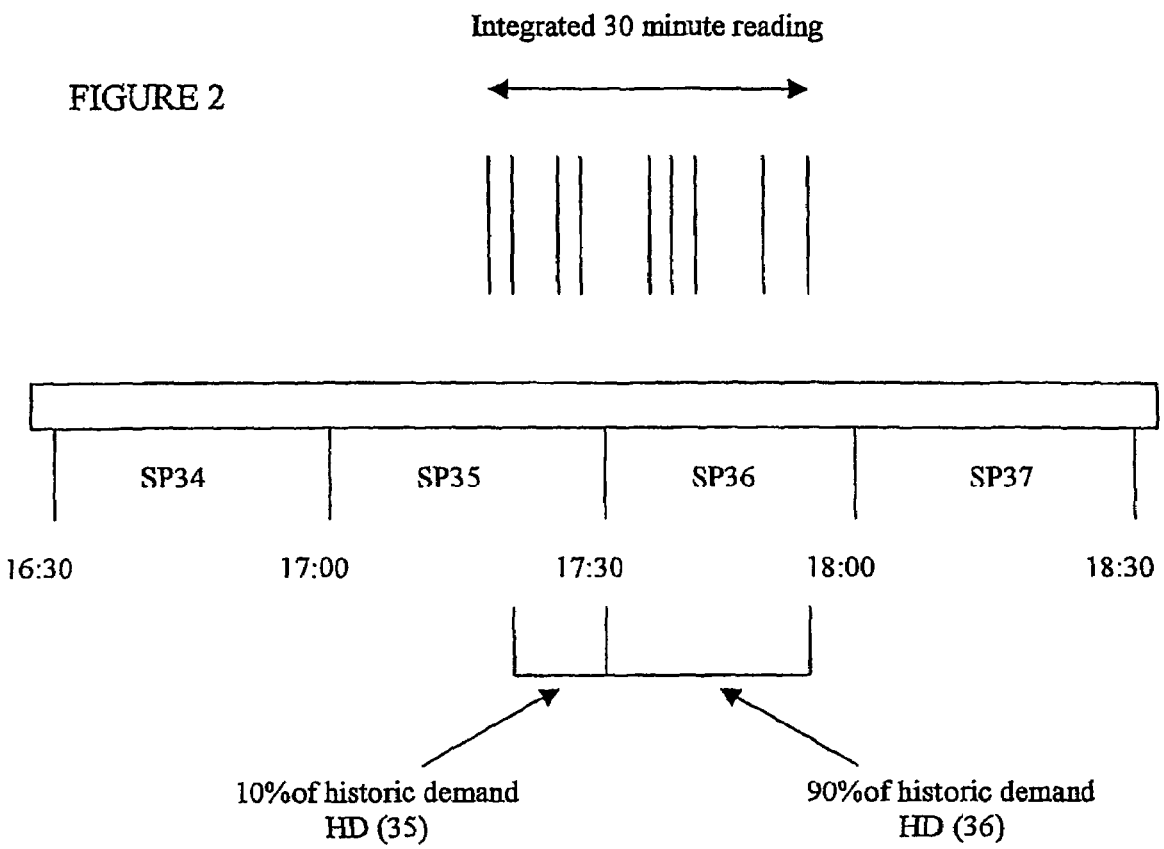
FIG. 2 is a diagram illustrating integration of spot readings of network energy demand.
Figure 3:
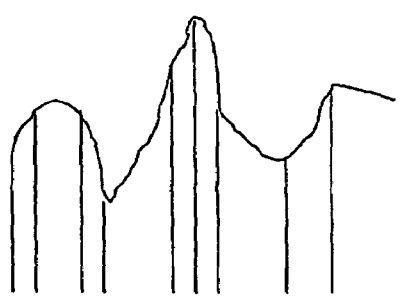
FIG. 3 is also a diagram illustrating integration of spot readings of network energy demand.
Figure 3:
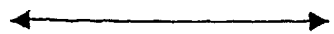

As each meter reading arrives and the value of NDspot is recomputed, the result needs to be turned into something that the market can use practically. What is required is a value of network demand (ND) that covers 30-minutes, for a settlement system based on a 30-minute Settlement Period. As each new value of NDspot is recomputed, all the NDspot values over the previous 30-minutes are integrated to give an estimate of total demand over a 30-minute period. This is not a Settlement Period of 30-minutes, but a rolling 30-minute period as illustrated in FIGS. 2 and 3.

As each value of ND is calculated for a rolling 30-minute period, a corresponding value of historic demand (HD) needs to be calculated. The value of ND will probably straddle two Settlement Periods. For example, as shown in FIG. 2, if the latest ND figure covers 3 minutes in Settlement Period SP35 (i.e. Settlement Period 35 out of 48 for a full day) and 27 minutes of SP36, then the comparable rolling historic demand (HD*) could be based on $$HD^* = 10\% \text{ of HD (35)} + 90\% \text{ of HD (36)}$$

The value of 30-minute ND can then be compared with comparable historic demand. The difference is D*, an index which is calculated by server 16 and published to users 20, 21 and 22 by server 18.

$$D^* = ND - HD^*$$

The value of ND at Gate Closure should be subtracted from the subsequent values of ND. The result will give an indication of variation from ND post Gate Closure.

$$D^{**} = D^* - D^*(\text{at Gate Closure})$$

This can also be calculated by server 16 and published by server 18

The value of D* can be used to influence the volume and price of traded options designed to hedge the impact of SBP (System Buy Price) and SSP (System Sell Price). As the value of D* changes with time, so traders will continually refine their positions in the market.

The following are some basic option structure examples. The assumption is that S is the option strike price, and all options are exchange traded and therefore standardised in size to, say, 1MWh.

Call Option payout=SBP(X)–S(X) where SBP(X)–S(X)>0

Put Option payout=S(X)–SBP(X) where S(X)–SBP(X)>0

Call Option payout=SSP(X)–S(X) where SSP(X)–S(X)>0

Put Option payout=S(X)–SSP(X) where S(X)–SSP(X)>0

An alternative market of options is the trade in D*. If there is a fixed payout of say £20/MWh and SV is the Strike volume of D*, then Call Option payout=D*(X)–SV(X) where D*(X)–SV(X)>0

Put Option payout=SV(X) D*(X)–where SV(X)–D*(X)>0

More complex options would evolve in due course covering multiple Settlement Periods e.g. all overnight Settlement Periods in a month or all Settlement Periods 35 for working days in a particular month. Other complex options such as bull and bear or spark spreads would also evolve.

Trading will evolve through a typical 24 hour period leading up to a particular Settlement Period Early in the 24 hour period and right up to Gate Closure, there will be a mixture of physical purchases of electricity to balance positions and also some financial. Post Gate closure only financial trades will be of practical value. In Delta hedging, the financial volumes would be expected to be vastly greater and they would outstrip physical trades at all times by perhaps a factor of 4.

Some specific scenarios will now be discussed by way of example.

In a first scenario, a cold front moves in off the Atlantic The retailer is expecting to sell 100 MWh of electricity in a particular Settlement Period under normal conditions and the retailer has already procured this volume of physical electricity. Now at t–15 hours, the demand for electricity is expected to rise because of the cold front At this stage, it is unknown whether demand will increase by 10 or 50 MWh but the current expectation is for 30 MWh based on empirical forecasts and information on D*. The retailer is Delta hedging. The retailer is short 30 MWh physical (at £20/MWh) and buys (perhaps) 120 MW (×4) of SBP call options (average premium paid might be £0.5/MWh) of various strike prices and various volumes. On the other hand the retailer might buy 30 MWh physical and then consider the probability distribution of errors around his new physical position. He could then trade SBP and SSP options to hedge the risk of errors arising from being long or short. The actual volume of options procured will be determined by the quantitative analysis of the risks and the strategy employed by the retailer.

The producer will be the seller of the physical energy and the options (in the first instance). The financial options will cover a range of power generation units and a range of volumes and prices.

At a time t−14 hours, the demand expectation has changed again. Both the retailers and producers will rebalance the physical and financial options books to take account of the latest information. There will be an on-going rebalancing process all the way to Gate Closure. The price (and practical value) in the market of the physical energy and the associated financial options will change (higher or lower) incrementally in the market with time.

After Gate Closure and up to physical consumption of energy, only financial options can be traded. In this period (the balancing market), the network operator is bilaterally managing the physical position energy with producers to balance the network. If a producer has sold a particular volume of options at a particular average strike price, the producer will aspire to fulfil the complementary physical position in the balancing market with the network operator by using a range of power generating units to get the volume and the average price. If the producer achieves this result, then the producer has a hedged position.

SBP and SSP (£/MWh) are known very soon after the physical energy has been consumed in a Settlement Period. Assume that SBP out-turns at £40/MWh and SSP is £10/MWh. For those SBP call options purchased by the retailer at a strike price (S) less than £40/MWh, the options have some financial value and they are exercised to yield £(40−S)/MWh to the retailer. The converse is true for SSP options.

The producer, as the writer of a call option, pays out to the retailer for those call options at strike prices below SBP. Those call options at strike prices above SBP provide an income to marginal high priced power generation units and they are effectively being rewarded for providing network security (insurance for the network).

In a second scenario, an international football match looks like going to extra time. The retailer is expecting to sell 100 MWh of electricity in a particular Settlement period under normal conditions and the retailer has already procured this volume of physical electricity. The retailer knows that there is a real possibility of increased demand because of the TV pickup. How does the retailer hedge this risk? At t−1 hour, the retailer is beyond Gate Closure.

At this stage, it is unknown whether demand will increase by 10 or 50 MWh but the current expectation is for 30 MWh if the game goes to extra time. The retailer is Delta hedging. The retailer trades an appropriate volume of both SBP options (average premium paid might be £0.5/MWh) of various strike prices and various volumes and SSP options. The actual volume of options procured will be determined by the quantitative analysis of the risks and the strategy employed by the retailer.

The producer will be the seller of the physical energy and the options (in the first instance). The financial options will cover a range of power generating units and a range of volumes and prices.

At a time t−5 minutes, the demand expectation is more accurate. Both the retailers and producers will rebalance financial options books to take account of the latest information. There will be an on-going rebalancing process all the way to actual consumption and the end of the Settlement Period of interest Options trading is of practical and commercial benefit up to the point where SBP and SSP are publicly known. What this means is that actual real time trading of SBP and SSP options can happen in tandem with actual real-time consumption of electricity.

The D* index will provide a measure of the magnitude of the imbalance. In the electricity industry, there is what is known as a 'merit order of plant' of successively increasing cost to generate. There is common knowledge of the relative price and cost of individual power generating units available for balancing right across the market. The merit order stacks the plant so that the lowest cost plant runs first and successively more expensive plant is called on to meet changes in demand (the merit order of generation bids will also include bids from the demand side of the market to reduce demand). The merit order for generation was formally coded into the market trading arrangements known as the electricity Pool. Even though this formal coding no longer exists, the physical reality of a merit order is still there. This is true of all similar markets around the world. There will also be a merit order of bids to reduce generation (and increase demand). As the magnitude of D* increases (positive and negative), the network operator will call on successively more expensive bids in the merit order to correct the imbalances. All the traders can estimate which power generating units will be called upon to fulfil the requirements of correcting imbalances. Whilst this is not absolutely correct, there is sufficient data for all the traders to trade imbalance penalties. Once the market matures and becomes more organised, then the market price will become more transparent and the merit order will become less relevant in correlating prices. The D* index will become the benchmark against which all the traders correlate prices.

A typical market index is designed to provide a common market indicator along a common market perspective. D* is a market index that is designed to solve the problems of orthogonal market perspectives. For example, the producers are trying to hedge their activities (price and volume) in the physical balancing market for each of their electricity generating units. However the retailers are hedging SBP and SSP that are the result of the average of all the activities of all the traders in the market. D* provides a common framework for both types of market participant and so both parties can then trade hedges (options) across the market.

The merit order data will enable traders to estimate price and volume of options. By applying the theory underpinning Delta hedging and standard quantitative tools such as "Monte Carlo" simulation retailers will be able to calculate the volume of hedging required and the value/price of the options under various scenarios.

The volume of options purchased by the retailer will reflect the retailer's appetite for risk (on physical imbalances and network security) and the magnitude of his expected exposure in the market The producers will do similar calculations to value the balancing service. The volume of options sold by each producer will reflect expected physical volume sold into the balancing market plus the additional volume of service provided to risk adverse retailers in terms of the network security service. Through this process, the producer is signalling his market share aspirations in the balancing market and network security market assuming that the producer is taking a risk-balanced position where the volume and price of financial options traded represents the producers anticipated physical position. If the producer does not take a balanced position, then the producer is acting as a market speculator.

The options traded can cover individual Settlement Periods of different blocks of time. There are several classes of options that this solution covers. One is the conventional type of financial option that is directly hedging SBP and SSP prices. An alternative is an option based on trading the D* index itself. If D* is greater than or less than a particular value, then that triggers a payment from the option writer to the option holder. These are the key traded products.

In a further alternative the market might also want hedges that are directly related to the value of D* and D**. Similar option structures can be developed for these indexes. An analogy with FTSE100 options, for example, would provide a useful structure.

Exotic options can cover a whole range of complex options products that combine several simple products into one product. There are other derived indexes that spin out of D*.

The value of D* will change with time. If Delta hedging is followed, the traders will have to continuously rebalance the physical and options positions. The parameter Gamma (a standard term in commodity trading) determines how often rebalancing should be carried out Rebalancing involves selling the current position and taking a new position in the market.

By use of the preferred embodiment of the invention, there is historic data on the demand for energy in each Settlement Period going back many years. Often demand is classified into that energy consumed in a working day, non-working day and season. The average demand over the past 5 years, for example, is calculated on the basis of working day and non-working day for each month of the year. Some allowance may have to be made for clock change dates and also public holidays in the calculation of historic average demand.

It would also be useful to inflate the calculated average demand by demand inflation. Typically, national electricity demand in the UK is increasing at 1.6% pa (long term average rate) through economic growth. However actual growth in demand varies on an annual basis depending on the actual economic activity and the economic cycle. Application of actual demand inflation can be used to bring the calculated average demand up-to-date.

To a first approximation, retailers will be purchasing energy on the basis of historic data to estimate the demand of their customers. Variations in actual demand relative to historic data are an indication of how over or under contracted a retailer might be in the market. A retailer therefore needs to estimate how his demand is likely to change in the near future relative to the historic averages as an estimate of potential imbalances.

There is a direct correlation between ND(*), HD(*) and D*. These variables will be available to the traders in the market and so they will be able to convert between the variables.

Whilst the meters on the network may not provide an indication of all the energy consumed (for example, embedded generation may not be reflected in meter readings) the readings give a good indication of the variation in demand relative to historic demand and also in the change in the demand profile during the day. It is the variation that matters in terms of meeting the needs of the traders under this solution.

There are two steps in the demand forecasting process for a retailer's own demand.

Firstly, the retailer needs to have information on how real-time demand (ND) is varying relative to historic averages. Through this process, the retailer will be able to take account of those environmental or external factors that are affecting consumer behaviour. The retailer can then more accurately predict what ND might be in the near future, such as a few hours away. The resultant prediction will have an error distribution associated with it. Secondly, the retailer needs to correlate 'own' historic demand with ND. This reflects the retailer's specific customer portfolio. Again the resultant answer will have an error distribution associated with it.

Combining these two forecasts and the associated error distributions will allow a retailer to forecast his own demand in the future using the current ND data. The retailer may also use other data to refine the forecast. There will be a probability distribution of how good the resultant forecast is. The probability distribution will provide the retailer with information on the balance between physical and financial hedging. The prediction process can also be rationalised on a regional) basis so that a supplier can make more accurate estimates of own demand Thus, in accordance with the invention the solution to the markets problems has three elements: the forecasting of the retailers own demand error; the use of a commonly applicable index by producers and retailers that gives a measure of imbalance in the market; and the use of financial derivatives that hedge the financial consequences of imbalances.

The creation of an historic average of demand using several years of data, using Settlement and/or real-time metering data, provides a base level against which activities will be measured. The average demands will probably be calculated for each of a number (e.g. 48) of Settlement Periods for months of the year, classified into working day and non-working day, etc. and could take account of a structure used by a trade body of the electricity supply industry in constructing load profiles.

In accordance with preferred embodiments of the invention, there is provided a technical solution that enables dynamic very short-term planning and scheduling of generating plant in response to network and industry dynamics (short-term fluctuations in consumer demand, changes in generating plant availability, network failures etc) so that traders can be more effective at balancing the system. Use of the invention enables all the traders in the power market to actively participate on a real-time basis in the collective process of determining how much generating capacity is required for network security and how much power should be produced to meet the needs of consumers, considerably reducing the reliance on the network operator in centrally contracting for capacity and balancing the system on a Settlement Period basis, though there will probably still be a requirement for the network operator to balance within the Settlement Period. This will improve the efficiency of resource allocation in the industry.

The invention has particular resonance for retailers of energy. The retailers currently do not know what the demand is of their customers in a timely way. It is technologically possible to meter every customer and collect the data, but the data would not be timely (and the solution would be complicated and expensive). The invention provides a simpler alternative technological solution enabling retailers to take account of network and industry dynamics on a real-time basis to change their position in terms of ensuring generating capacity and production to meet customer needs.

The various traders in the market express their views on the requirements of scheduling generating capacity and production through the trading of contracts both for physical energy and hedging strategies. The invention provides a real-time network index that enables real-time contract trading that enables real-time scheduling of plant to balance and secure the network by the traders rather than over dependence on the network operator. Trading of physical contracts leads to changes in the operation of physical generating plant. Hedging strategies deal with the uncertainty in the physical position which naturally have price implications. The description above uses both the language of physical balancing and of trading to describe the impact of the invention on the trader behaviour on the network It will also be seen that the invention provides a system using a commonly applicable index by producers and retailers to give an indication of the degree of imbalance on the network, enabling traders to contract for production and hedging capacity from producers so as to secure their trading position and ultimately as a dynamic aid to physically balance and securing the network over intervals of time.

The invention claimed is:

1. A system for analysing energy usage on an energy supply network which includes a number of energy sources supplying energy to the network, and a number of energy consumers connected to the network, the system including a plurality of meters on the network which monitor energy usage on the network, the meters supplying data to data processing apparatus which aggregates the data so as to provide an indication of current total energy usage, and which stores data so as to permit the retrieval of historical energy usage for a time in a year, wherein the data processing apparatus further compares current total energy usage for a particular time in a year with a standard total energy usage for that time in a year, based on historical energy usage, and generates an index which indicates the difference between the current total energy usage for that time in a year and the standard energy usage for that time in a year.

2. A system as claimed in claim 1, wherein the standard total energy usage for a time in a year is the average over a number of years of historical energy usage for that time in a year.

3. A system as claimed in claim 1, wherein the particular time in a year is a period of time.

4. A system as claimed in claim 3, wherein the period of time is a rolling period of predetermined length.

5. A system as claimed in claim 4, wherein historical energy usage data is available for fixed periods of time, and standard total energy usage for a rolling period of time which straddles two of the fixed periods of time is calculated by combining values from the two fixed periods of time in a ratio according to the length of each fixed period of time which is covered by the rolling period of time.

6. A system as claimed in claim 1, wherein a time interval is required to complete the acquisition of data from all of the meters, and once the data has been acquired from all of the meters and aggregated, subsequent aggregate totals are calculated at intervals substantially shorter than said time interval using the latest data received from all of the meters.

7. A system as claimed in claim 6, wherein said subsequent aggregate totals are calculated upon receipt of updated data from any meter.

8. A system as claimed in claim 6, wherein subsequent aggregate totals are calculated at predetermined intervals using all updated data received from meters which has been received during the interval since the previous calculation of an aggregate total.

9. A system as claimed in claim 6, wherein upon calculation of a subsequent aggregate total, there is also calculated an integrated estimate of current total energy usage over a rolling period of time of predetermined length.

10. A system as claimed in claim 9, wherein historical energy usage data is available for fixed periods of time, and standard total energy usage for a rolling period of time which straddles two of the fixed periods of time is calculated by combining values from the two fixed periods of time in a ratio according to the length of each fixed period of time which is covered by the rolling period of time.

11. A system as claimed in claim 1, wherein the network is managed by a network operator which contracts with a number of different traders comprising producers who supply energy to the network, and retailers who sell energy to the consumers.

12. A system as claimed in claim 11, wherein the index provides an indication of the degree of imbalance between supply and demand on the network to the producers and retailers, and the index is used by retailers and producers in contracting for production of energy.

13. A system as claimed in claim 11, wherein the index provides an indication of the degree of imbalance between supply and demand on the network to the retailers, and is used by retailers to hedge capacity from producers.

14. A system as claimed in claim 1, wherein the index is used to assist in physically balancing the network in terms of production and consumption of energy.

15. A system for reducing the consequences of imbalances in an energy network in which energy retailers contract for the supply of energy from energy producers, the system comprising the steps of using a commonly applicable index by producers and retailers to give an indication of the degree of imbalance on the network, and using the index so that retailers and producers can contract for production, and retailers can hedge capacity from producers, in such a way as to assist in physically balancing the network.

16. A system as claimed in claim 15, wherein the index is used to influence the volume and price of traded options concerning the purchase of energy by retailers from producers.

17. A system as claimed in claim 15, wherein data concerning current energy usage on the network is supplied to data processing apparatus which aggregates the data so as to provide an indication of current total energy usage, and which stores data so as to permit the retrieval of historical energy usage for a time in a year, wherein the data processing apparatus further compares current total energy usage for a particular time in a year with a standard total energy usage for that time in a year, based on historical energy usage, and generates said index as an indication of the difference between the current total energy usage for that time in a year and the standard energy usage for that time in a year.

18. A system as claimed in claim 17, wherein:
   (a) the standard total energy usage for a time in a year is the average over a number of years of historical energy usage for that time in a year; and
   (b) the particular time in a year is a rolling period of time of predetermined length.

19. A system for analysing energy usage on a network which includes a number of energy sources and a number of energy consumers, the system including a plurality of meters on the network which monitor energy usage on the network, wherein the meters supply data to data processing apparatus which aggregates the data so as to provide an indication of current total energy usage, wherein data is received from different ones of the meters at different points in a period of time, and once the data has been received from all of the meters at the end of that period of time and aggregated, subsequent aggregate totals are calculated at intervals substantially shorter than said period of time, using the latest data received from the meters.

20. A system as claimed in claim 19, wherein said subsequent aggregate totals are calculated upon receipt of updated data from any meter.

* * * * *